(12) United States Patent
Ishiguro et al.

(10) Patent No.: US 10,001,193 B2
(45) Date of Patent: Jun. 19, 2018

(54) TRANSMISSION BELT

(71) Applicant: Mitsuboshi Belting Ltd., Nagata-ku, Kobe-shi, Hyogo (JP)

(72) Inventors: Hisato Ishiguro, Hyogo (JP); Keiji Takano, Hyogo (JP); Yoshihiro Miura, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 129 days.

(21) Appl. No.: 14/781,078

(22) PCT Filed: Mar. 27, 2014

(86) PCT No.: PCT/JP2014/059049
§ 371 (c)(1),
(2) Date: Sep. 29, 2015

(87) PCT Pub. No.: WO2014/157592
PCT Pub. Date: Oct. 2, 2014

(65) Prior Publication Data
US 2016/0298725 A1    Oct. 13, 2016

(30) Foreign Application Priority Data

Mar. 29, 2013 (JP) ................... 2013-073402
Mar. 6, 2014 (JP) ................... 2014-043510

(51) Int. Cl.
*F16G 1/10*    (2006.01)
*F16G 5/08*    (2006.01)
(Continued)

(52) U.S. Cl.
CPC .................. *F16G 1/10* (2013.01); *B32B 7/12* (2013.01); *B32B 25/042* (2013.01); *B32B 25/14* (2013.01);
(Continued)

(58) Field of Classification Search
CPC ..... F16G 1/10; F16G 1/28; F16G 5/08; F16G 5/20
See application file for complete search history.

(56) References Cited

U.S. PATENT DOCUMENTS 7,244,207 B2    7/2007    Shiriike et al.
7,749,698 B2    7/2010    Beuvink et al.
(Continued)

FOREIGN PATENT DOCUMENTS

CN    1540184 A    10/2004
CN    1957092 A    5/2007
(Continued)

OTHER PUBLICATIONS

Oct. 26, 2015—(JP) Notification of Reasons for Refusal—App 2014-043510, Eng Tran.
(Continued)

*Primary Examiner* — William E Dondero
*Assistant Examiner* — Mark K Buse
(74) *Attorney, Agent, or Firm* — Banner & Witcoff, Ltd.

(57) ABSTRACT

The present invention relates to a power transmission belt containing a tension member extending in a belt lengthwise direction, an adhesion rubber layer in contact with at least a part of the tension member, a compression rubber layer formed on one surface of the adhesion rubber layer, and a tension rubber layer formed on other surface of the adhesion rubber layer, in which the compression rubber layer is formed of a vulcanized rubber composition containing a rubber component, a polyolefin resin and a reinforcing material, the rubber component contains a chloroprene rubber, and the reinforcing material contains a short fiber.

11 Claims, 3 Drawing Sheets

(51) Int. Cl.
*F16G 5/20* (2006.01)
*F16G 1/28* (2006.01)
*B32B 25/04* (2006.01)
*B32B 7/12* (2006.01)
*B32B 25/14* (2006.01)
*B32B 27/32* (2006.01)
*C08L 21/00* (2006.01)

(52) U.S. Cl.
CPC .............. *B32B 27/32* (2013.01); *C08L 21/00* (2013.01); *F16G 1/28* (2013.01); *F16G 5/08* (2013.01); *F16G 5/20* (2013.01); *B32B 2262/0215* (2013.01); *B32B 2262/0223* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/062* (2013.01); *B32B 2262/065* (2013.01); *B32B 2262/08* (2013.01); *B32B 2262/106* (2013.01); *B32B 2264/108* (2013.01); *B32B 2270/00* (2013.01); *B32B 2274/00* (2013.01); *B32B 2307/536* (2013.01); *B32B 2307/732* (2013.01); *B32B 2433/00* (2013.01)

(56) References Cited

U.S. PATENT DOCUMENTS

| | | | |
|---|---|---|---|
| 8,329,282 B2 | 12/2012 | Sueto et al. | |
| 8,845,468 B2* | 9/2014 | Takahashi | C08K 3/04 474/148 |
| 2001/0034282 A1* | 10/2001 | Hasaka | B29D 29/10 474/260 |
| 2002/0039947 A1* | 4/2002 | Hasaka | F16G 1/06 474/263 |
| 2003/0027920 A1* | 2/2003 | Kinoshita | B29C 70/50 524/508 |
| 2004/0214676 A1* | 10/2004 | Shiriike | F16G 5/20 474/260 |
| 2008/0194613 A1 | 8/2008 | Beuvink et al. | |
| 2008/0286529 A1* | 11/2008 | Sueto | F16G 1/10 428/167 |
| 2009/0156344 A1* | 6/2009 | Hsiao | F16G 1/10 474/263 |
| 2010/0167861 A1* | 7/2010 | Shiriike | F16G 1/08 474/263 |
| 2011/0086735 A1* | 4/2011 | Takahashi | C08K 3/04 474/148 |
| 2013/0237354 A1* | 9/2013 | Shiriike | F16G 5/06 474/148 |
| 2015/0111677 A1* | 4/2015 | Nishiyama | F16G 1/10 474/264 |
| 2015/0369335 A1* | 12/2015 | Ishiguro | C08K 7/02 474/260 |
| 2016/0040749 A1* | 2/2016 | Kageyama | B32B 25/10 474/8 |

FOREIGN PATENT DOCUMENTS

| | | |
|---|---|---|
| CN | 101099052 A | 1/2008 |
| CN | 101413564 A | 4/2009 |
| EP | 2711587 A1 | 3/2014 |
| JP | H05-63656 B2 | 9/1993 |
| JP | H10-238596 A | 9/1998 |
| JP | 2004-324794 A | 11/2004 |
| JP | 2010-151209 A | 7/2010 |
| JP | 2012-241831 A | 12/2012 |

OTHER PUBLICATIONS

Nov. 16, 2016—(EP) Extended Search Report—App 14773244.0.
Apr. 12, 2016—(JP) Notification of Reasons for Refusal—App 2014-043510, Eng Tran.
Jul. 1, 2014—International Search Report—Intl App PCT/JP2014/059049.
Dec. 29, 2016—(CN) Notification of the Second Office Action—App 201480019247.6.
Jun. 2, 2016—(CN) Notification of First Office Action—App 201480019247.6.

* cited by examiner

[FIG. 1]
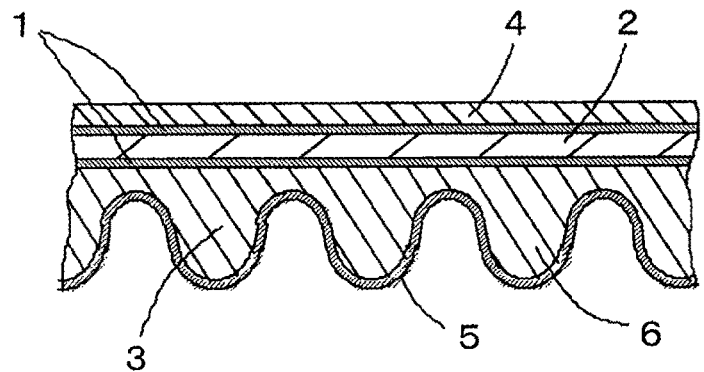
[FIG. 2]
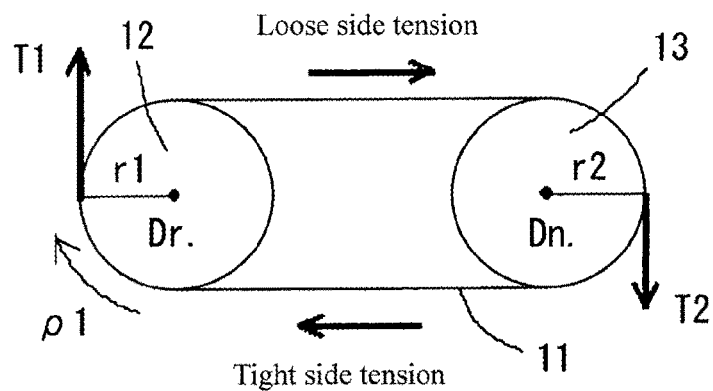
[FIG. 3]
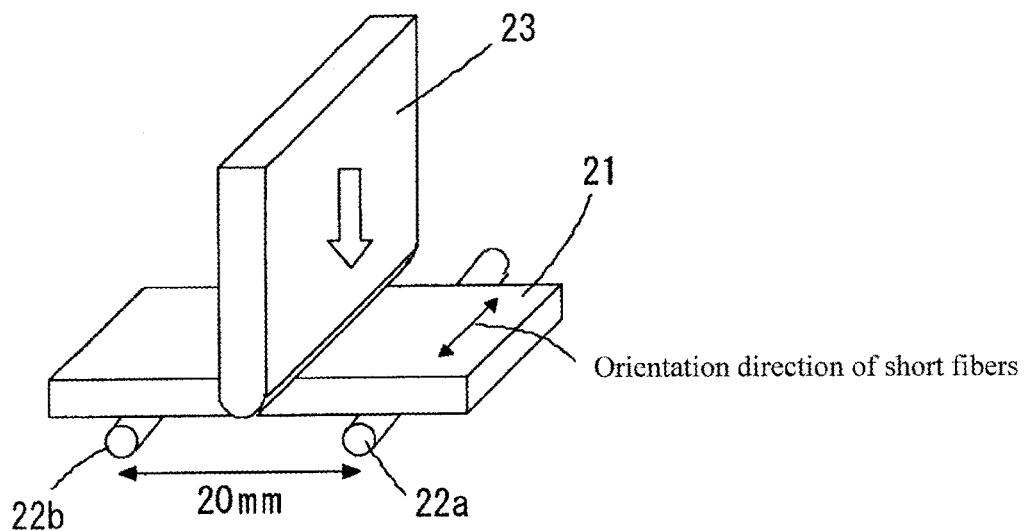

[FIG. 4]
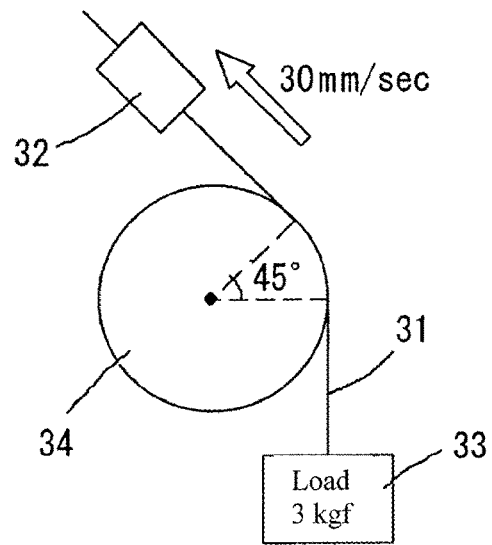
[FIG. 5]
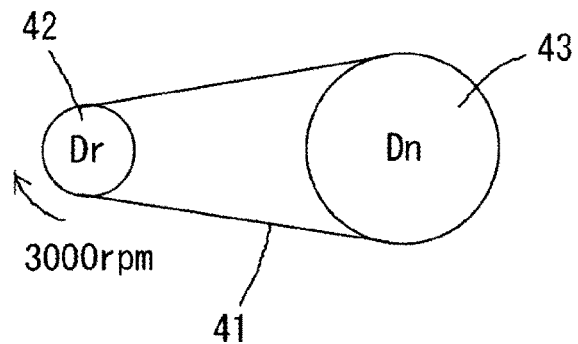
[FIG. 6]
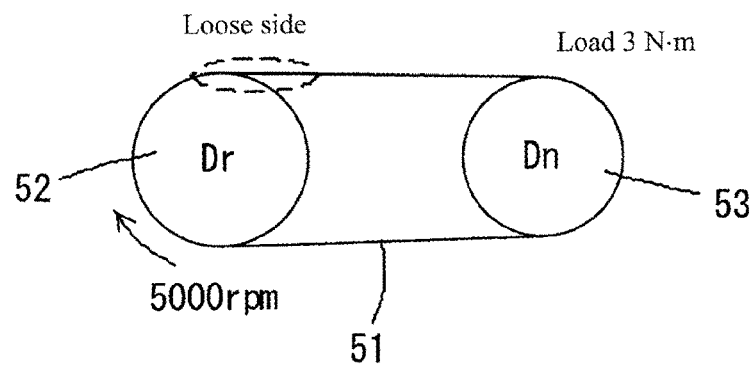

[FIG. 7]
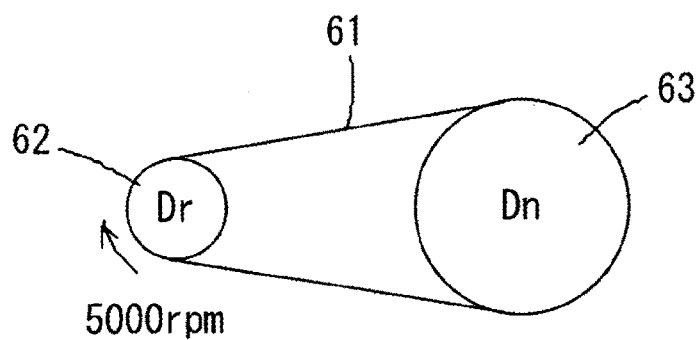
[FIG. 8]
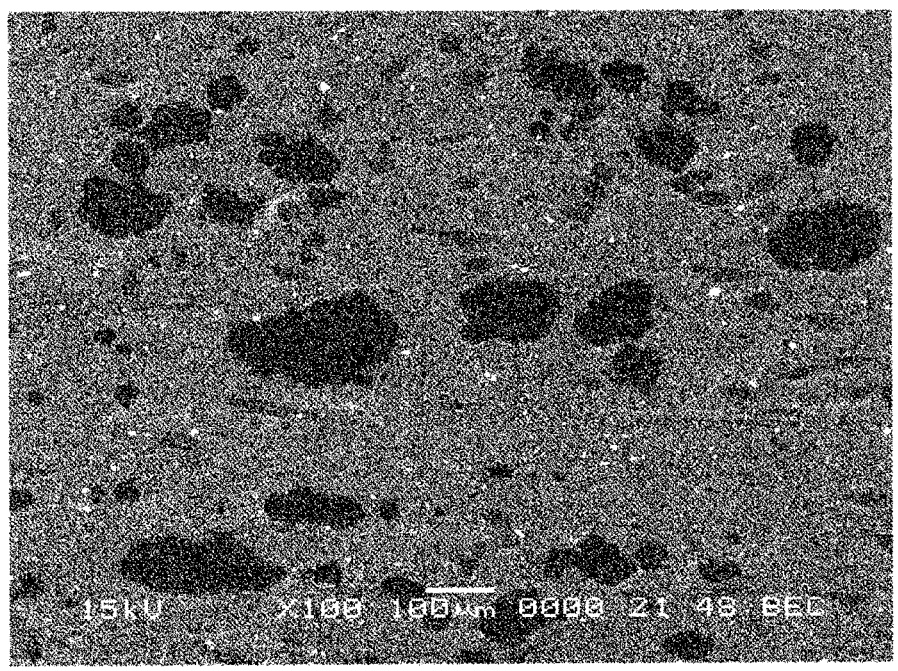

TRANSMISSION BELT

CROSS REFERENCE TO RELATED APPLICATIONS

This is a U.S. National Phase Application under 35 U.S.C. § 371 of International Application No. PCT/JP2014/059049, filed Mar. 27, 2014, which claims priority to Japanese Application Nos. 2013-073402 and 2014-043510, filed Mar. 29, 2013 and Mar. 6, 2014, respectively, the entire disclosures of which are incorporated herein by reference.

TECHNICAL FIELD

The present invention relates to a power transmission belt such as a V-belt or a V-ribbed belt, and in detail, relates to a power transmission belt excellent in durability performance and transmission efficiency.

BACKGROUND ART

Conventionally, in order to improve lateral pressure resistance of a power transmission belt such as a V-belt or a V-ribbed belt, short fibers are added as a reinforcing material to a compression rubber layer. For example, PTL 1 discloses a rubber V-belt in which in a belt provided with an adhesive elastic body layer having a tension member embedded therein and retention elastic body layers (compression rubber layers) located on upper and lower sides of the adhesive elastic body layer, the retention elastic body layer contains chloroprene rubber, a reinforcing filler, a metal oxide vulcanizing agent, bismaleimide, and aramid short fibers, and the aramid short fibers are arranged in a width direction of the belt. In this patent literature, elastic modulus in a grain direction (an orientation direction of the short fibers) is increased by the arrangement of the aramid short fibers, thereby maintaining lateral pressure resistance, and durability is improved.

PTL 2 discloses a power transmission V-belt in which rubber hardness of at least one of a tension rubber layer and a compression rubber layer is set to a range of from 90 to 96°, rubber hardness of an adhesion rubber layer is set to a range of from 83 to 89°, and aramid short fibers are arranged in a belt width direction in the tension rubber layer and the compression rubber layer. This patent literature prevents the occurrence of cracks and separation (peeling) of a tension member from each rubber layer in early stage, and improves lateral pressure resistance, thereby improving high load transmission capability.

In recent years, a power transmission belt is required to improve fuel consumption saving properties in order to improve fuel economy performance by reducing transmission loss of a belt, other than the above-described lateral pressure resistance and durability. For example, PTL 2 describes in paragraph [0005] that when rubber hardness of the belt is increased, bending rigidity is increased, and as a result, transmission loss occur in a small pulley diameter. For this reason, an attempt is made to suppress transmission loss by providing cogs on an inner circumferential side or both an inner circumferential side and an outer circumferential side (back face side) of a V-belt to decrease bending rigidity of a belt. A cogged V-belt is generally known as the belt of this kind.

For the improvement of lateral pressure resistance and durability, it is effective means to increase amounts of a reinforcing material such as high modulus short fibers such as aramid fibers or carbon black, thereby increasing rubber hardness, as described in the above-described patent literatures. However, the increase of rubber hardness leads to the increase of bending rigidity of a belt, resulting in the decrease of bending fatigue performance and the increase of transmission loss of the belt in a small pulley diameter, and this leads to the decrease of fuel consumption saving properties. On the other hand, when rubber hardness is decreased in order to improve bending fatigue performance and fuel consumption saving properties, lateral pressure is decreased and a belt is likely to early reach the end of the life thereof. That is, a series of characteristics of lateral pressure resistance and durability is in a trade-off relationship with a series of characteristics of bending fatigue performance and fuel consumption saving properties. Bending fatigue performance and fuel consumption saving properties can be improved by providing cogs on an inner circumferential side or both an inner circumferential side and an outer circumferential side of a V-belt. However, because rubber hardness is increased for the purpose of maintaining lateral pressure resistance and durability, it is the current situation that fuel consumption saving properties are not yet sufficient. For this reason, a preferred rubber composition (particularly, a rubber composition of a compression rubber layer) is desired.

There is a variable speed belt used in a continuously variable transmission, as the V-belt of this kind. In order to change a transmission gear ratio (a speed ratio between a drive pulley and a driven pulley) in the variable speed belt, the belt moves up and down (or back and forth) in a pulley radius direction on the pulley. If this movement is not smoothly conducted, shear force from the pulley strongly acts, and as a result, peeling occurs between rubber layers (an adhesion rubber layer and a compression rubber layer) or between an adhesion rubber layer and a tension member, and fuel consumption saving properties (not fuel consumption saving properties due to bending rigidity, but fuel consumption saving properties based on the decrease of sliding properties) are decreased. To respond to this, an attempt is made to reduce a friction coefficient and improve sliding properties by adding large amounts of a reinforcing material such as short fibers or carbon black to increase rubber hardness, or projecting short fibers from a frictional power transmission surface. However, coexistence of durability performance (lateral pressure resistance and durability) and transmission efficiency (fuel consumption saving properties), which are in trade-off relationship with each other, is not sufficiently established.

PTL 3 discloses a frictional power transmission belt in which a belt body is wound so as to contact with pulleys to transmit power, in which at least a pulley contact portion of the belt body is formed of a rubber composition containing an ethylene-α-olefin elastomer and a powdery or granular polyolefin resin contained therein. This patent literature has an object to improve low sound-generating properties and abrasion resistance by blending a powdery or granular polyolefin resin to short fibers that cannot be blended in a large amount due to uniformity of a composition and material costs. In the examples of this patent literature, a rubber composition containing 75 parts by mass of carbon black and 25 parts by mass of nylon short fibers blended to 100 parts by mass of chloroprene rubber is prepared. However, this composition is described as a comparative example in which sound pressure is high and abrasion loss is large.

However, this patent literature does not describe fuel consumption saving properties, and additionally, even though this belt is applied to a variable speed belt requiring fuel consumption saving properties, fuel consumption saving properties were low and durability was also low.

CITATION LIST

Patent Literature

PTL 1: JP-B-H05-63656
PTL 2: JP-A-H10-238596
PTL 3: JP-A-2004-324794

SUMMARY OF INVENTION

Technical Problem

Accordingly, an object of the present invention is to provide a power transmission belt that can improve lateral pressure resistance and durability while maintaining fuel consumption saving properties.

Another object of the present invention is to provide a power transmission belt in which even though the proportion of a reinforcing material such as short fibers is small, the change of transmission efficiency after traveling is small and durability under high temperature environment can be improved.

Solution to Problem

As a result of intensive investigations to achieve the above objects, the present inventors have found that when a compression rubber layer of a power transmission belt is formed of a vulcanized rubber composition containing chloroprene rubber, a polyolefin resin and short fibers, lateral pressure resistance and durability can be improved while maintaining fuel consumption saving properties, and have completed the present invention.

That is, the power transmission belt of the present invention contains: a tension member extending in a belt lengthwise direction; an adhesion rubber layer in contact with at least a part of the tension member; a compression rubber layer formed on one surface of the adhesion rubber layer; and a tension rubber layer formed on other surface of the adhesion rubber layer, in which the compression rubber layer is formed of a vulcanized rubber composition containing a rubber component, a polyolefin resin and a reinforcing material, the rubber component contains a chloroprene rubber, and the reinforcing material contains a short fiber.

The reinforcing material may have a proportion of 80 parts by mass or less per 100 parts by mass of the rubber component. The polyolefin resin may have a proportion of from 5 to 40 parts by mass per 100 parts by mass of the rubber component. The polyolefin resin may have a proportion of from 15 to 50 parts by mass per 100 parts by mass of the reinforcing material. The short fiber may have a proportion of from 15 to 25 parts by mass per 100 parts by mass of the rubber component. The reinforcing material may contain an aramid short fiber and a carbon black. The polyolefin resin may have an average molecular weight of from 200,000 to 6,000,000 in a method measured according to ASTM D4020. A raw material of the polyolefin resin may have an average particle diameter of from 25 to 200 µm. The polyolefin resin in the compression rubber layer may have a long slender shape having an aspect ratio of from 1.6 to 10, a major axis direction may be oriented in substantially parallel to a belt width direction, and a minor axis direction may be oriented in substantially parallel to the belt lengthwise direction. The polyolefin resin may be exposed on a surface of the compression rubber layer. The polyolefin may have an occupation area of from 0.2 to 30% on a surface of the compression rubber layer. The power transmission belt of the present invention may be a belt used in a continuously variable transmission.

Advantages Effect of Invention

In the present invention, because a compression rubber layer of a power transmission belt is formed of a vulcanized rubber composition containing chloroprene rubber, a polyolefin resin and a short fiber, lateral pressure resistance and durability can be improved while maintaining fuel consumption saving properties. Furthermore, even though the proportion of a reinforcing material such as short fibers is small, the change of transmission efficiency after traveling is small, and durability under high temperature environment can be improved.

BRIEF DESCRIPTION OF THE DRAWINGS

FIG. 1 is a schematic cross-sectional view illustrating one example of a power transmission belt.

FIG. 2 is a schematic view for explaining a measurement method of transmission efficiency.

FIG. 3 is a schematic view for explaining a measurement method of bending stress in Examples.

FIG. 4 is a schematic view for explaining a measurement method of friction coefficient in Examples.

FIG. 5 is a schematic view for explaining a high load traveling test in Examples.

FIG. 6 is a schematic view for explaining a high speed traveling test in Examples.

FIG. 7 is a schematic view for explaining a traveling durability test in Examples.

FIG. 8 is a view showing a scanning electron micrograph of a cross-section of a compression rubber layer of the belt obtained in Example 3.

DESCRIPTION OF EMBODIMENTS

[Compression Rubber Layer]

The power transmission belt of the present invention is provided with a tension member extending in a belt lengthwise direction, an adhesion rubber layer in contact with at least a part of the tension member, a compression rubber layer formed on one surface of the adhesion rubber layer, and a tension rubber layer formed on the other surface of the adhesion rubber layer, and the compression rubber layer is formed of a vulcanized rubber composition containing a rubber component, a polyolefin resin and a reinforcing material.

(Rubber Component)

In the present invention, the rubber component contains chloroprene rubber from the standpoint that durability can be improved. As the chloroprene rubber, use can be made of conventional chloroprene rubbers.

The chloroprene rubber contains trans-1,4 bond that has a relatively high stereoregularity as a main unit, and may further contain cis-1,2 bond and a small amount of 1,2 or 3,4 bond. The proportion of the trans-1,4 bond may be 85% or more, and the proportion of the cis-1,2 bond may be 10% or more.

The glass transition temperature of the chloroprene rubber may be, for example, from −50 to −20° C., and is preferably from −40 to −20° C.

The chloroprene rubber may be sulfur-modified type and may be non-sulfur-modified type.

The rubber component may further contain other vulcanizable or crosslinkable rubber component. Examples of the other vulcanizable or crosslinkable rubber component include other diene rubbers (e.g., natural rubber, isoprene rubber, butadiene rubber, styrene-butadiene rubber (SBR), acrylonitrile-butadiene rubber (nitrile rubber), hydrogenated nitrile rubber, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluorine rubber. Those rubber components can be used alone or in combination of two or more kinds thereof.

The proportion of the chloroprene rubber in the rubber component may be about 50 mass % or more (particularly from 80 to 100 mass %), and only the chloroprene rubber (100 mass %) is particularly preferred.

(Polyolefin Resin)

In the present invention, by blending a polyolefin resin to the vulcanized rubber composition of the compression rubber layer, a friction coefficient of the compression rubber layer is decreased and abrasion resistance of the belt can be improved. Generally, in order to improve fuel consumption saving properties, a friction coefficient is decreased by excessively adding short fibers. However, cracks easily occur in the interface between rubber component and the short fibers, and there is a possibility that durability is impaired. On the other hand, when a polyolefin resin is added in place of increasing the amount of the short fibers, since the polyolefin resin has relatively low density, the friction coefficient can be decreased even by a small addition and this can contribute to fuel consumption saving properties. Particularly, when the short fibers are worn away by friction with belt traveling, the friction coefficient is increased. However, the increase of the friction coefficient can be suppressed by the presence of a polyolefin resin even though the short fibers are worn away by friction, and fuel consumption saving properties can be maintained over a long period of time. Furthermore, appropriate hardness necessary for durability can be achieved by adding an appropriate amount of a polyolefin resin. Additionally, the volume proportion of short fibers is decreased by using the short fibers in combination with a polyolefin resin, and the cracks in the interface between rubber and the short fibers, which are a defect when a large amount of short fibers was added, can be suppressed. In detail, the polyolefin resin becomes flexible due to the heat generated during traveling, and even though peeling (fine cracks) occurs in the interface between rubber and the short fibers, the polyolefin resin dispersed nearby eases stress concentration (plays a role of cushion) and can suppress the growth of the cracks. Particularly, the polyolefin resin plays a role of a reinforcing material by a small addition, differing from a reinforcing material such as short fibers and carbon black. It is presumed that in the present invention, by the combination of those actions, lateral pressure resistance rigidity can be increased and durability can be improved while maintaining fuel consumption saving properties.

The polyolefin resin is relatively inexpensive in material cost as compared with short fibers that are produced by cutting long fibers and further require an adhesive treatment for imparting adhesiveness to a rubber. Therefore, it is also excellent in economic efficiency that the proportion of short fibers can be suppressed.

The polyolefin resin may be a polymer containing α-polyolefin such as ethylene, propylene, 1-butene, 2-butene, 1-pentene, 1-hexene, 3-methylpentene, or 4-methylpentene (particularly, α-$C_{2-6}$ polyolefin such as ethylene or propylene) as a main polymerization component.

Examples of a copolymerizable monomer other than the α-polyolefin include (meth)acrylic monomers [e.g., $C_{1-6}$ alkyl (meth)acrylate such as methyl (meth)acrylate or ethyl (meth)acrylate], unsaturated carboxylic acids (e.g., maleic anhydride), vinyl esters (e.g., vinyl acetate or vinyl propionate), and dienes (such as butadiene or isoprene, etc.). Those monomers can be used alone or in combination of two more kinds thereof.

Examples of the polyolefin resin include polyethylene resins, and polypropylene resins (such as polypropylene, propylene-ethylene copolymer, propylene-butene-1 copolymer or propylene-ethylene-butene-1 copolymer, etc.). Those polyolefins can be used alone or in combination of two or more kinds thereof.

Of those polyolefin resins, polyethylene resins and polypropylene resins are preferred, and polyethylene resins are preferred from a standpoint that the effect of reducing a friction coefficient is large.

The polyethylene resin may be a polyethylene homopolymer (homopolymer), and may be a polyethylene copolymer (copolymer). Examples of a copolymerizable monomer contained in the copolymer include olefins (e.g., α-$C_{3-8}$ olefin such as propylene, 1-butene, 2-butene, 1-pentene, 1-hexene, 3-methylpentene, 4-methylpentene, or 1-octene), (meth)acrylic monomers (e.g., $C_{1-6}$ alkyl (meth)acrylate such as methyl (meth)acrylate or ethyl (meth)acrylate), unsaturated carboxylic acids (e.g., maleic anhydride), vinyl esters (e.g., vinyl acetate or vinyl propionate), and dienes (such as butadiene, isoprene, etc.). Those copolymerizable monomers can be used alone or in combination of two or more kinds thereof. Of those copolymerizable monomers, α-$C_{3-8}$ olefins such as propylene, 1-butene, 1-hexene, 4-methylpentene, and 1-octene are preferred. The proportion of the copolymerizable monomer is preferably 30 mol % or less (e.g., from 0.01 to 30 mol %), more preferably 20 mol % or less (e.g., from 0.1 to 20 mol %), and still more preferably 10 mol % or less (e.g., from 1 to 10 mol %). The copolymer may be a random copolymer, a block copolymer or the like.

Examples of the polyethylene resin include low, medium or high density polyethylene, linear low density polyethylene, ultrahigh molecular weight polyethylene, ethylene-propylene copolymer, ethylene-butene-1 copolymer, ethylene-propylene-butene-1 copolymer, and ethylene-(4-methylpentene-1) copolymer. Those polyethylene resins can be used alone or in combination of two or more kinds thereof. Of those polyolefin resins, ultrahigh molecular weight polyethylene is particularly preferred from a standpoint that durability of a belt can be improved.

The average molecular weight of the polyolefin resin (particularly polyethylene resin) can be selected from a range of, for example, from 10,000 to 12,000,000 in a method measured according to ASTM D4020. The lower limit may be, for example, 50,000 or more or 100,000 or more, and is preferably 200,000 or more, more preferably 500,000 or more, and particularly preferably 1,000,000 or more. The upper limit of the average molecular weight may be, for example, 10,000,000 or less or 8,500,000 or less, and is preferably 8,000,000 or less, more preferably 7,500,000 or less, still more preferably 7,000,000 or less, and particularly preferably 6,000,000 or less. Where the molecular weight is too small, mechanical properties and heat resistance are decreased and additionally, a friction coefficient becomes too large, thereby abrasion loss is increased and there is concern that durability is decreased. On the other hand, where it is too large, bending properties of a belt are decreased, thereby durability is decreased, and additionally, a friction coefficient becomes too small, and a belt is easy to slip.

It is preferred that the polyolefin resin is substantially uniformly dispersed in a vulcanized rubber composition in a prescribed size. The shape of the polyolefin resin in the vulcanized rubber composition is a spherical shape or a long slender shape (rod shape or fiber shape). The average diameter of a major axis thereof may be, for example, from 5 to 500 μm (e.g., from 10 to 500 μm), and is preferably from 20 to 500 μm (e.g., from 30 to 500 μm), and more preferably from 100 to 300 μm (particularly from 150 to 250 μm). The average diameter of a minor axis may be, for example, from 30 to 500 μm (e.g., from 30 to 400 μm), and is preferably from 30 to 350 μm (e.g., from 30 to 300 μm), and more preferably from 50 to 200 μm (particularly from 70 to 150 μm). The aspect ratio (average diameter of major axis/average diameter of minor axis) may be, for example, from 1 to 16 (e.g., from 1.4 to 14), and is preferably from 1.6 to 12 (e.g., from 1.6 to 10), and more preferably from 1.7 to 5 (e.g., from 1.8 to 3). In the present invention, in the case where the polyolefin resin is strongly embedded and dispersed in a rubber in the state of being deformed into a long slender shape (e.g., a shape like a potato shape) by utilizing an anchor effect in the compression rubber layer, the polyolefin resin is further suppressed from falling out of the surface of the compression rubber layer, and fuel consumption saving properties can be maintained over a loner period of time, which is preferred.

The polyolefin resin having such the long slender shape is obtained by such a manner that a granular polyolefin polymer having a substantially isotropic shape (e.g., substantially spherical shape, polyhedral shape or indefinite shape) receives shear force in the state of being softened by the heat generated in the rubber composition in the course of being kneaded in the rubber composition and deforms into a long slender shape. The average particle diameter (primary particle diameter) of a raw material before deformation may be, for example, from 10 to 300 μm, and is preferably from 20 to 250 μm, and more preferably from 25 to 200 μm (particularly, from 50 to 150 μm). Where the particle diameter is too small, economic efficiency is decreased; and where it is too large, uniform dispersion in the composition becomes difficult, and durability is decreased by the decrease of abrasion resistance.

It is preferred that the polyolefin resin having a long slender shape is embedded such that a major axis orients in substantially parallel to a width direction of the belt and a minor axis orients in substantially parallel to a lengthwise direction (circumferential direction) of the belt. Because the belt requires flexibility in the lengthwise direction, the decrease of flexibility of the belt can be suppressed by orienting a major axis direction of the polyolefin resin that decreases flexibility of the belt to a belt width direction. Furthermore, because the minor axis side (edge of a major axis direction) of the polyolefin resin is exposed on the surface of the compression rubber layer (frictional power transmission surface) by orienting the minor axis direction to a lengthwise direction of the belt, the polyolefin resin is strongly embedded in the layer and the polyolefin resin is difficult to fall out even though the frictional power transmission surface slides with pulleys. A general method for making a major axis direction of the polyolefin rein orient to a belt width direction is, for example, a method of rolling by rolls.

In the present invention, an average diameter of a major axis and a minor axis, and an average particle diameter can be measured by a measurement soft ("analySIS" manufactured by Soft Imaging System) from an image observed with a scanning electron microscope.

The melting point (or softening point) of the polyolefin resin may be, for example, from 10 to 300° C., and is preferably from 20 to 275° C., and more preferably from about 30 to 250° C. Where the melting point is too high, it becomes difficult to deform into a long slender shape in a kneading process; and where it is too low, durability may be decreased.

In order to decrease a friction coefficient and to improve fuel consumption saving properties, it is preferred that the polyolefin resin is exposed on the surface of the compression rubber layer (frictional power transmission surface). The area occupied by the polyolefin resin on the frictional power transmission surface may be, for example, from 0.1 to 40% (e.g., from 0.2 to 30%), and is preferably from 0.5 to 25% (e.g., from 1 to 20%), and more preferably from about 3 to 15% (particularly from 5 to 10%). Where the area occupied by the polyolefin resin is too small, the effect of reducing a friction coefficient is small; and where it is too large, a friction coefficient is excessively decreased, and slip becomes easy to occur. In the present invention, the proportion of area occupied by the polyolefin resin is obtained by observing the surface of a frictional power transmission surface by a scanning electron microscope to confirm a phase separation structure of the rubber and the polyolefin resin, and with respect to the phase formed of the polyolefin resin, calculating the area occupied by the phase formed of the polyolefin resin by a measurement soft ("analySIS" manufacture by Soft Imaging System).

The phase structure of the polyolefin resin on the frictional power transmission surface is not particularly limited so long as it is adhered in the above area proportion. It may be either of a sea-island phase separation structure in which an island phase is formed of a polyolefin resin and short fibers, and a sea-island phase separation structure in which the island phase is formed of a rubber component and short fibers. Those phase separation structures can be controlled by adjusting mainly the proportion of the polyolefin resin, but the sea-island phase separation structure in which the polyolefin resin is an island phase is preferred from a standpoint that it is possible to adjust to an appropriate friction coefficient.

The proportion of the polyolefin resin can be selected from a range of from about 0.1 to 50 parts by mass per 100 parts by mass of the rubber component from a standpoint that both mechanical characteristics such as lateral pressure resistance and fuel consumption saving properties can be achieved. The lower limit may be, for example, 1 part by mass or more, and is preferably 3 parts by mass or more, more preferably 5 parts by mass or more, and particularly preferably about 10 parts by mass or more. The upper limit of the proportion of the polyolefin resin may be, for example, 45 parts by mass or less, and is preferably 40 parts by mass or less, more preferably 35 parts by mass or less, and particularly preferably about 30 parts by mass or less, per 100 parts by mass of the rubber component.

Furthermore, the proportion of the polyolefin resin can be selected from a range of from about 1 to 100 parts by mass, and may be, for example, from 5 to 90 parts by mass, and is preferably from 10 to 80 parts by mass, and more preferably from about 15 to 50 parts by mass (particularly, from 20 to 40 parts by mass), per 100 parts by mass of the following reinforcing material.

Where the proportion of the polyolefin resin is too small, projection of the polyolefin resin on the rubber layer is decreased, and the effect of reducing a friction coefficient is decreased.

On the other hand, where the proportion of the polyolefin resin is too large, a friction coefficient is excessively decreased and as a result, a belt slips, and bending fatigue resistance of the compression rubber layer is decreased (because the compression rubber layer becomes hard and bending stress is increased). As a result, loss by bending is increased in the state that a winding diameter of a belt is small, and fuel consumption saving properties are decreased. Furthermore, dispersibility of the polyolefin resin is decreased to cause poor dispersion, and there is a possibility that cracks are generated in the compression rubber layer in an early state from the portions as the starting point.

(Reinforcing Material)

The reinforcing material contains at least short fibers. Examples of the short fibers include synthetic fibers such as polyolefin fibers (such as polyethylene fiber and polypropylene fiber, etc.), polyamide fibers (such as polyamide 6 fiber, polyamide 66 fiber and polyamide 46 fiber, etc.), polyalkylene arylate fibers (such as $C_{2-4}$ alkylene $C_{6-14}$ arylate fibers such as polyethylene terephthalate (PET) fiber and polyethylene naphthalate (PEN) fiber, etc.), vinylon fibers, polyvinyl alcohol fibers, and polyparaphenylene benzobisoxazole (PBO) fibers; natural fibers such as cotton, hemp and wool; and inorganic fibers such as carbon fibers. Those short fibers can be used alone or in combination of two or more kinds thereof. Of those short fibers, synthetic fibers and natural fibers, particularly synthetic fibers (such as polyamide fibers and polyalkylene arylate fibers) are preferred, and above all, short fibers containing at least aramid fibers are preferred from a standpoint that a friction coefficient can be reduced while maintaining flexibility and lateral pressure resistance.

Examples of the aramid short fibers include polyparaphenylene terephthalamide fiber (e.g., "TWARON (registered trademark)" manufactured by Teijin Limited, and "KEVLAR (registered trademark)" manufactured by Du Pont-Toray Co., Ltd.), a copolymer fiber of polyparaphenylene terephthalamide and 3,4'-oxydiphenylene terephthalamide (e.g., "TECHNORA (registered trademark)" manufactured by Teijin Limited), and polymetaphenylene isophthalamide fiber that is meta-type (e.g., "CONEX (registered trademark)" manufactured by Teijin Limited) and "NOMEX (registered trademark)" manufactured by Du-Pont). Those aramid short fibers can be used alone or in combination of two kinds or more thereof.

In order to suppress compression deformation of a belt against pressing force from pulleys, the short fibers are embedded in the compression rubber layer by being made to orient in a belt width direction. A general method for making the short fibers orient to a belt width direction is, for example, a method of rolling by rolls. By projecting the short fibers from the surface of the compression rubber layer, a friction coefficient of the surface is decreased, thereby suppressing noises (sound generation), and abrasion due to rubbing with pulleys can be reduced. The average length of the short fibers may be, for example, from 1 to 20 mm, and is preferably from 2 to 15 mm, and more preferably from 3 to 10 mm, and it may be from about 1 to 5 mm (e.g., from 2 to 4 mm). Where the average length of the short fibers is too short, mechanical characteristics (e.g., modulus) in a grain direction cannot be sufficiently increased; and where it is too long, poor dispersion of the short fibers in the rubber composition occurs, thereby generating cracks in the rubber, and there is a possibility that a belt is damaged in an early stage. The average fiber diameter may be, for example, from 5 to 50 μm, and is preferably from 7 to 40 μm, and more preferably from about 10 to 35 μm.

The proportion of the short fibers may be, for example, from 10 to 40 parts by mass, and is preferably from 12 to 35 parts by mass, and more preferably from about 13 to 30 parts by mass (particularly, from 15 to 25 parts by mass), per 100 parts by mass of the rubber component. Where the proportion of the short fibers is too small, mechanical characteristics of the compression rubber layer are insufficient; and where it is too large, bending fatigue resistance of the compression rubber layer is decreased (the compression rubber layer becomes hard, and bending stress is increased). As a result, loss by bending is increased in the state that a winding diameter of a belt is small, and fuel consumption saving properties are decreased. Furthermore, where the proportion of short fibers is too large, dispersibility of the short fibers in the rubber composition is decreased to cause poor dispersion, and there is a possibility that cracks are generated in the compression rubber layer in an early stage from the portions as the starting point. In the present invention, because the proportion of the short fibers can be suppressed to the above range (in particular, from 15 to 25 parts by mass per 100 parts by mass of the rubber component) due to the blending of the polyolefin resin, both mechanical characteristics and fuel consumption saving properties of a belt can be achieved.

To improve adhesiveness to a rubber component, the short fibers can be treated by various adhesive treatments, for example, a treatment liquid containing an initial condensate of phenols and formalin (such as a prepolymer of novolac or resol type phenol resin), a treatment liquid containing a rubber component (or a latex), a treatment liquid containing the initial condensate and rubber component (latex), or a treatment liquid containing a reactive compound (adhesive compound) such as a silane coupling agent, an epoxy compound (an epoxy resin, etc.) or an isocyanate compound. In the preferred adhesive treatment, the short fibers may be subjected to an adhesive treatment using the treatment liquid containing the initial condensate and rubber component (latex), particularly at least a resorcin-formalin-latex (RFL) liquid. The adhesive treatment can be generally conducted by dipping the fibers in the RFL liquid, followed by heating and drying, thereby uniformly forming an adhesive layer on the surface thereof. Examples of the latex of the RFL liquid include chloroprene rubber, a styrene-butadiene-vinyl pyridine terpolymer, hydrogenated nitrile rubber (H-NBR) and nitrile rubber (NBR). Those treatment liquids may be used by combining those. For example, the short fibers may be subjected to an adhesive treatment such as a pre-treatment (pre-dipping) with a reactive compound (adhesive compound) such as an epoxy compound (such as an epoxy resin) and an isocyanate compound or a rubber paste treatment (overcoating) after an RFL treatment, and then further treated with an RFL liquid.

The reinforcing material may contain the conventional reinforcing material, for example, a carbon material such as carbon black, silicon oxide such as hydrated silica, clay, calcium carbonate, talc, and mica, in addition to the short fibers. Of those reinforcing materials, carbon black is widely used.

The proportion of the reinforcing material (the total amount of reinforcing material containing short fibers) may be 90 parts by mass or less, and is, for example, 80 parts by mass or less (e.g., from 10 to 80 parts by mass), preferably from 20 to 70 parts by mass, and more preferably from about 30 to 60 parts by mass (particularly from 40 to 55 parts by mass), per 100 parts by mass of the rubber component. Where the proportion of the reinforcing material is too small, there is a possibility that mechanical characteristics of the compression rubber layer are decreased. On the other hand, where the proportion of the reinforcing material is too large, the volume proportion of the polyolefin resin is decreased. As a result, it is difficult to project the polyolefin resin on the surface of the compression rubber layer in a prescribed area, and there is a possibility that a friction coefficient of a belt cannot be reduced.

(Additives Such as Vulcanizing Agent)

As necessary, the rubber composition may contain a vulcanizing agent or a crosslinking agent (or a crosslinking agent type), a co-crosslinking agent, a vulcanization assistant, a vulcanization accelerator, a vulcanization retarder, a metal oxide (e.g., zinc oxide, magnesium oxide, calcium oxide, barium oxide, iron oxide, copper oxide, titanium oxide or aluminum oxide), a softener (e.g., oils such as paraffin oil and naphthenic oil), a processing agent or a processing aid (such as stearic acid, stearic acid metal salt, wax or paraffin), an age resister (such as an antioxidant, a thermal age resister, an antiflex-cracking agent or an antiozonant, etc.), a colorant, a tackifier, a plasticizer, a coupling agent (such as a silane coupling agent, etc.), a stabilizer (such as an ultraviolet absorber or a thermal stabilizer, etc.), a flame retardant, an antistatic agent, and the like. The metal oxide may act as a crosslinking agent.

As the vulcanizing agent or crosslinking agent, the conventional components can be used depending on the kind of the rubber component, and examples thereof include the above metal oxide (such as magnesium oxide and zinc oxide, etc.), an organic peroxide (such as diacyl peroxide, peroxyester and dialkyl peroxide, etc.), and a sulfur type vulcanizing agent. Examples of the sulfur type vulcanizing agent include powdered sulfur, precipitated sulfur, colloidal sulfur, insoluble sulfur, highly dispersible sulfur, and sulfur chloride (such as sulfur monochloride or sulfur dichloride, etc.). Those crosslinking agents or vulcanizing agents may be used alone or in combination of two or more kinds thereof. When the rubber component is chloroprene rubber, a metal oxide (such as magnesium oxide and zinc oxide, etc.) may be used as the vulcanizing agent or crosslinking agent. The metal oxide may be used by combining with other vulcanizing agent (such as sulfur type vulcanizing agent, etc.), and the metal oxide and/or the sulfur type vulcanizing agent may be used alone or by combining with a vulcanization accelerator.

The amount of the vulcanizing agent used can be selected from a range of from about 1 to 20 parts by mass per 100 parts by mass of the rubber component, depending on the kind of the vulcanizing agent and the rubber component. For example, the amount of the organic peroxide used as the vulcanizing agent may be from 1 to 8 parts by mass, and can be selected from a range of preferably from 1.5 to 5 parts by mass, and more preferably from about 2 to 4.5 parts by mass, per 100 parts by mass of the rubber component. The amount of the metal oxide used may be from 1 to 20 parts by mass, and can be selected from a range of preferably from 3 to 17 parts by mass, and more preferably from about 5 to 15 parts by mass (e.g., from 7 to 13 parts by mass) per 100 parts by mass of the rubber component.

Examples of the co-crosslinking agent (a crosslinking aid or a co-vulcanizing agent (co-agent)) include the conventional crosslinking aids, for example, polyfunctional (iso) cyanurate (e.g., triallyl isocyanurate (TAIC) or triallyl cyanurate (TAC), etc.), polydiene (e.g., 1,2-polybutadiene, etc.), a metal salt of unsaturated carboxylic acid (e.g., zinc (meth) acrylate or magnesium (meth)acrylate, etc.), oximes (e.g., quinone dioxime, etc.), guanidines (e.g., diphenyl guanidine, etc.), polyfunctional (meth)acrylate (e.g., ethylene glycol di(meth)acrylate, butanediol di(meth)acrylate or trimethylolpropane tri(meth)acrylate, etc.), bismaleimides (aliphatic bismaleimide such as N,N'-1,2-ethylene bismaleimide or 1,6'-bismaleimide-(2,2,4-trimethyl)cyclohexane; and arene bismaleimide or aromatic bismaleimide, such as N,N'-m-phenylene bismaleimide, 4-methyl-1,3-phenylene bismaleimide, 4,4'-diphenylmethane bismaleimide, 2,2-bis[4-(4-maleimidophenoxy)phenyl]propane, 4,4'-diphenylether bismaleimide, 4,4'-diphenylsulfone bismaleimide, or 1,3-bis (3-maleimidophenoxy)benzene). Those crosslinking aids can be used alone or in combination of two or more kinds thereof. Of those crosslinking aids, bismaleimides (arene bismaleimide or aromatic bismaleimide such as N,N'-m-phenylene dimaleimide) are preferred. The degree of crosslinking is increased by the addition of bismaleimides, and adhesive wear can be prevented.

The proportion of the co-crosslinking agent (crosslinking aid) can be selected from a range of, for example, from about 0.01 to 10 parts by mass, and may be, for example, from 0.1 to 5 parts by mass (e.g., from 0.3 to 4 parts by mass), and preferably from about 0.5 to 3 parts by mass (e.g., from 0.5 to 2 parts by mass) per 100 parts by mass of the rubber component in terms of solid contents.

Examples of the vulcanization accelerator include thiuram accelerators (e.g., tetramethylthiuram.monosulfide (TMTM) tetramethylthiuram.disulfide (TMTD), tetraethylthiuram.disulfide (TETD), tetrabutylthiuram.disulfide (TBTD), dipentamethylenethiuram tetrasulfide (DPTT) or N,N'-dimethyl-N,N'-diphenylthiuram.disulfide), thiazole accelerators (e.g., 2-mercaptobenzothiazole, zinc salt of 2-mercaptobenzothiazole, 2-mercaptothiazoline, dibenzothiazyl.disulfide, or 2-(4'-morphorinodithio)benzothiazole), sulfenamide accelerators (e.g., N-cyclohexyl-2-benzothiazylsulfenamide (CBS), or N,N'-dicyclohexyl-2-benzothiazylsulfenamide), bismaleimide accelerators (e.g., N,N'-m-phenylenebismaleimide or N,N'-1,2-ethylenebismaleimide), guanidines (such as diphenylguanidine or di-o-tolylguanidine), urea or thiourea accelerators (e.g., ethylene thiourea), dithiocarbamates and xanthogenates. Those vulcanization accelerators can be used alone or in combination of two or more kinds thereof. Of those vulcanization accelerators, TMTD, DPTT, CBS and the like are widely used.

The proportion of the vulcanization accelerator may be, for example, from 0.1 to 15 parts by mass, and may be preferably from 0.3 to 10 parts by mass, and more preferably from about 0.5 to 5 parts by mass per 100 parts by mass of the rubber component in terms of solid contents.

The amount of the softener (oils such as naphthenic oil) used may be, for example, from 1 to 30 parts by mass, and may be preferably from about 3 to 20 parts by mass (e.g., from 5 to 10 parts by mass) per 100 parts by mass of the total amount of the rubber component. The amount of the age resister used may be, for example, from 0.5 to 15 parts by mass, and may be preferably from 1 to 10 parts by mass, and more preferably from about 2.5 to 7.5 parts by mass (e.g., from 3 to 7 parts by mass) per 100 parts by mass of the total amount of the rubber component.

[Structure of Belt]

The structure of the power transmission belt is not particularly limited, and the belt only has to have the compression rubber layer capable of contacting pulleys. The power transmission belt is provided with a tension member extending in a lengthwise direction of the belt, an adhesion rubber layer in contact with at least a part of the tension member, a compression rubber layer formed on one surface of the adhesive layer, and a tension rubber layer formed on other surface of the adhesion rubber layer.

FIG. 1 is a schematic cross-sectional view illustrating one example of a power transmission belt. In this example, a tension member 2 is embedded in an adhesion rubber layer 1, a compression rubber layer 3 is laminated on one surface of the adhesion rubber layer 1, and a tension rubber layer 4 is laminated on the other surface of the adhesion rubber layer 1. The tension member 2 is integrally embedded in the form of being sandwiched between a pair of adhesion rubber sheets. Furthermore, a reinforcing cloth 5 is laminated on the compression rubber layer 3, and cog portions 6 are formed by a mold with cogs. A laminate of the compression rubber layer 3 and the reinforcing cloth 5 is integrally formed by vulcanizing a laminate of a reinforcing cloth and a compression rubber layer sheet (an unvulcanized rubber sheet).

An example of a cogged V-belt is illustrated in the above example, but the structure is not limited to the above structure, and can be applied to various belts having the compression rubber layer (e.g., a raw edged belt or a V-ribbed belt).

[Tension Rubber Layer]

The tension rubber layer may be formed of a vulcanized rubber composition containing the rubber component as exemplified in the compression rubber layer, and may contain a reinforcing material and a polyolefin resin, similar to the compression rubber layer. Furthermore, the tension rubber layer may be a layer formed of the same vulcanized rubber composition as the compression rubber layer.

[Adhesion Rubber Layer]

Similar to the vulcanized rubber composition of the compression rubber layer, the vulcanized rubber composition for forming the adhesion rubber layer may contain a rubber component (such as chloroprene rubber, etc), a vulcanizing agent or a crosslinking agent (e.g., a metal oxide such as magnesium oxide or zinc oxide, or a sulfur type vulcanizing agent such as sulfur, etc), a co-crosslinking agent or a crosslinking aid (e.g., a maleimide crosslinking agent such as N,N'-m-phenylene dimaleimide, etc), a vulcanization accelerator (such as TMTD, DPTT and CBS, etc), an enhancer (such as carbon black and silica, etc), a softener (oils such as naphthenic oil, etc), a processing agent or a processing aid (such as stearic acid, stearic acid metal salt, wax, and paraffin, etc), an age resister, an adhesiveness improving agent (such as a resorcin-formaldehyde co-condensate and an amino resin (a condensate of a nitrogen-containing cyclic compound and formaldehyde, for example, a melamine resin such as hexamethylolmelamine or hexaalkoxymethylmelamine (such as hexamethoxymethylmelamine and hexabutoxymethylmelamine, etc), a urea resin such as methylolurea, and a benzoguanamine resin such as methylolbenzoguanamine resin, etc), those co-condensates (such as resorcin-melamine-formaldehyde co-condensate, etc), etc), a filler (such as clay, calcium carbonate, talc, and mica, etc), a colorant, a tackifier, a plasticizer, a coupling agent (such as a silane coupling agent, etc), a stabilizer (such as an ultraviolet absorber or a thermal stabilizer, etc), a flame retardant, an antistatic agent, and the like. In the adhesiveness improving agent, the resorcin-formaldehyde co-condensate and amino resin may be an initial condensate (prepolymer) of resorcin and/or a nitrogen-containing cyclic compound such as melamine, and formaldehyde.

In this rubber composition, a rubber of the same series (such as diene rubber) or same kind (such as chloroprene rubber) as the rubber component of the vulcanized rubber composition of the compression rubber layer is often used as the rubber component. Furthermore, the amounts of the vulcanizing agent or crosslinking agent, the co-crosslinking agent or crosslinking aid, the vulcanization accelerator, the enhancer, the softener, and the age resister used can be selected from the same ranges as in the rubber composition of the compression rubber layer, respectively. Furthermore, in the vulcanized rubber composition of the adhesion rubber layer, the amount of the processing agent or processing aid (such as stearic acid) used may be, for example, from 0.1 to 10 parts by mass, and may be preferably from 0.5 to 5 parts by mass, and more preferably from about 1 to 3 parts by mass per 100 parts by mass of the rubber component. Furthermore, the amount of the adhesiveness improving agent (such as resorcin-formaldehyde co-condensate and hexamethoxymethylmelamine) may be, for example, from 0.1 to 20 parts by mass, and may be preferably from 1 to 10 parts by mass, and more preferably from about 2 to 8 parts by mass per 100 parts by mass of the rubber component.

[Tension Member]

The tension member is arranged extending in a lengthwise direction of a belt, and is generally arranged in side-by-side at prescribed pitches parallel to the lengthwise direction of the belt. It is sufficient for the tension member if only at least a part thereof is in contact with the adhesion rubber layer, and it may be any of the embodiment that the tension member is embedded in the adhesion rubber layer, the embodiment that the tension member is embedded between the adhesion rubber layer and the tension rubber layer, and the embodiment that the tension member is embedded between the adhesion rubber layer and the compression rubber layer. Of those embodiments, the embodiment that the tension member is embedded in the adhesion rubber layer is preferred from a standpoint that durability can be improved.

Examples of the fiber constituting the tension member can include the same fibers as the short fibers. Of the fibers, synthetic fibers such as polyester fibers (polyalkylene arylate fibers) containing $C_{2-4}$ alkylene arylate such as ethylene terephthalate and ethylene-2,6-naphthalate as a main constituent unit, and aramid fibers, inorganic fibers such as carbon fibers, and the like are widely used from the standpoint of high modulus, and polyester fibers (polyethylene terephthalate fibers and ethylene naphthalate fibers) and polyamide fibers are preferred. The fiber may be a multifilament yarn. The fineness of the multifilament yarn may be, for example, from about 2,000 to 10,000 denier (particularly from 4,000 to 8,000 denier). The multifilament yarn may contain, for example, from 100 to 5,000 of, preferably from 500 to 4,000 of, and more preferably from about 1,000 to 3,000 of monofilament yarns.

Twisted cord (e.g., a piled cord, a piece twist cord or Lang twist cord) using a multifilament yarn can be generally used as the tension member. The average wire diameter of the tension member (fiber diameter of a twisted cord) may be, for example, from 0.5 to 3 mm, and may be preferably from 0.6 to 2 mm, and more preferably from about 0.7 to 1.5 mm.

In order to improve adhesiveness to a rubber component, the cord may be subjected to an adhesive treatment (or a surface treatment) in the same method as in the short fibers. It is preferred that the cord is subjected an adhesive treatment with at least an RFL liquid, similar to the short fibers.

[Power Transmission Efficiency]

When the power transmission belt provided with the compression rubber layer is used, power transmission efficiency can be greatly improved. The power transmission efficiency is an index that a belt transmits rotary torque from drive pulleys to driven pulleys, and means that the higher power transmission efficiency is, the smaller transmission loss of the belt is, and thereby fuel consumption saving properties are excellent. In a biaxial layout in which a belt 11 is hung over two pulleys of a drive pulley (Dr.) 12 and a driven pulley (Dn.) 13 as illustrated in FIG. 2, the power transmission efficiency can be obtained as follows.

When the number of revolutions of the drive pulley is $\rho_1$ and a pulley radius is $r_1$, rotary torque $T_1$ of the drive pulley can be represented by $\rho_1 \times Te \times r_1$. Te is an effective tension obtained by subtracting loose side tension (tension at a side that a belt moves toward a driven pulley) from tight side tension (tension at a side that a belt moves toward the drive pulley). Similarly, when the number of revolutions of the driven pulley is $\rho_2$ and a pulley radius is $r_2$, rotary torque $T_2$ of the driven pulley can be represented by $\rho_2 \times Te \times r_2$. The power transmission efficiency $T_2/T_1$ is calculated by dividing the rotary torque $T_2$ of the driven pulley by the rotary torque $T_1$ of the drive pulley, and it can be represented by the following formula.

$$T_2/T_1 = (\rho_2 \times Te \times r_2)/(\rho_1 \times Te \times r_1) = (\rho_2 \times r_2)/(\rho_1 \times r_1)$$

Practically, the power transmission efficiency does not become the value of not less than 1, but transmission loss of a belt is small as the value approaches 1, showing excellent fuel consumption saving properties.

A method for producing a belt is not particularly limited, and the conventional methods can be used. For example, the belt illustrated in FIG. 1 can be formed by forming a laminate of unvulcanized rubber layers having the above embodiment having tension member embedded therein by a mold, vulcanizing the laminate to mold into a belt sleeve and then cutting the vulcanized belt sleeve into a prescribed size.

EXAMPLES

The present invention is described below in more detail based on examples, but it should be understood that the present invention is not limited by those examples. In the following examples, raw materials used in the examples are shown below.

[Raw Material]
(Aramid Short Fiber)

Used was a short fiber having an adhesion ratio of solid contents of 6 mass % obtained by subjecting an aramid short fiber (average fiber length: 3 mm, "CONEX Short Fiber" manufactured by Teijin Technoproducts) to an adhesive treatment with an RFL liquid (containing resorcin, formaldehyde, and vinylpyridine-styrene-butadiene rubber latex as a latex). The used RFL liquid contained resorcin: 2.6 parts by mass, 37% formalin: 1.4 parts by mass, vinylpyridine-styrene-butadiene copolymer latex (manufactured by Zeon Corporation): 17.2 parts by mass, and water: 78.8 parts by mass.

(Polyolefin)

Polyolefins used are shown in Table 1 below.

TABLE 1

| | Company name | Trade name | Average particle diameter | Molecular weight (ASTM method) |
|---|---|---|---|---|
| Polyethylene (1) | Ticona | GUR4120 | 120 μm | 4,400,000 |
| Polyethylene (2) | Ticona | GUR2105 | 120 μm | 200,000 |
| Polyethylene (3) | Ticona | GUR4150 | 120 μm | 7,300,000 |
| Polyethylene (4) | Mitsui Chemicals, Inc. | MIPELON XM-221U | 25 μm | 2,000,000 |
| Polyethylene (5) | Ticona | GUR4022 | 120 μm | 4,400,000 |
| Polypropylene | Seishin Enterprise Co., Ltd. | PPW-5 | 20 μm | 200,000 |

(Other Additives)

Ether ester oil: "RS700" manufactured by ADEKA

Carbon black: "SEAST 3" manufactured by Tokai Carbon Co., Ltd.

Age resister: "NONFLEX OD3" manufactured by Seiko Chemical Co., Ltd.

Silica: "NIPSIL VN-3" manufactured by Tosoh Silica Corporation

Vulcanization accelerator: Tetramethylthiuram.disulfide (TMTD)

(Tension Member)

A fiber obtained through an adhesive treatment of cords having a total denier of 6,000 obtained by piling PET fibers of 1,000 denier under a twisting structure of 2×3 in a final twist coefficient of 3.0 and a first twist coefficient of 3.0.

Examples 1 to 9 and Comparative Examples 1 to 2

(Formation of Rubber Layer)

Each of rubber compositions in Table 2 (compression rubber layer and tension rubber layer) and Table 3 (adhesion rubber layer) was kneaded by using the conventional method such as Banbury mixer, and the respective kneaded rubbers were passed through calender rolls to prepare rolled rubber sheets (compression rubber layer sheet. tension rubber layer sheet and adhesion rubber layer sheet).

TABLE 2

| | Example | | | | | | | | | Comparative Example | |
|---|---|---|---|---|---|---|---|---|---|---|---|
| | 1 | 2 | 3 | 4 | 5 | 6 | 7 | 8 | 9 | 1 | 2 |
| Chloroprene rubber | 100 | 100 | 100 | 100 | 100 | 100 | 100 | 100 | 100 | 100 | 100 |
| Aramid short fiber | 20 | 20 | 20 | 20 | 20 | 20 | 20 | 20 | 20 | 20 | 20 |
| Polyethylene (1) | 1 | 5 | 10 | 40 | — | — | — | — | — | — | — |
| Polyethylene (2) | — | — | — | — | 10 | — | — | — | — | — | — |
| Polyethylene (3) | — | — | — | — | — | 10 | — | — | — | — | — |

TABLE 2-continued

|  | Example | | | | | | | | | Comparative Example | |
| --- | --- | --- | --- | --- | --- | --- | --- | --- | --- | --- | --- |
|  | 1 | 2 | 3 | 4 | 5 | 6 | 7 | 8 | 9 | 1 | 2 |
| Polyethylene (4) | — | — | — | — | — | — | 10 | — | — | — | — |
| Polyethylene (5) | — | — | — | — | — | — | — | 10 | — | — | — |
| Polypropylene | — | — | — | — | — | — | — | — | 10 | — | — |
| Naphthenic oil | 5 | 5 | 5 | 5 | 5 | 5 | 5 | 5 | 5 | 5 | 5 |
| Magnesium oxide | 4 | 4 | 4 | 4 | 4 | 4 | 4 | 4 | 4 | 4 | 4 |
| Carbon black | 30 | 30 | 30 | 30 | 30 | 30 | 30 | 30 | 30 | 30 | 40 |
| Age resister | 4 | 4 | 4 | 4 | 4 | 4 | 4 | 4 | 4 | 4 | 4 |
| Zinc oxide | 5 | 5 | 5 | 5 | 5 | 5 | 5 | 5 | 5 | 5 | 5 |
| N,N'-m-phenylene-dimaleimide | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Sulfur | 0.5 | 0.5 | 0.5 | 0.5 | 0.5 | 0.5 | 0.5 | 0.5 | 0.5 | 0.5 | 0.5 |
| Total | 173.5 | 177.5 | 182.5 | 212.5 | 182.5 | 182.5 | 182.5 | 182.5 | 182.5 | 172.5 | 182.5 |

Unit: parts by mass

TABLE 3

| | |
| --- | --- |
| Chloroprene rubber | 100 |
| Naphthenic oil | 5 |
| Magnesium oxide | 4 |
| Silica | 20 |
| Carbon black | 30 |
| Resorcin•formalin copolymer | 1.5 |
| Age resister | 4 |
| Zinc oxide | 5 |
| Vulcanization accelerator TMTD | 1 |
| N,N'-m-phenylenedimaleimide | 2 |
| Stearic acid | 2 |
| Hexamethoxymethylolmelamine | 3.5 |
| Total | 178 |

Unit: parts by mass (Production of Belt)

A laminate of a reinforcing cloth and the compression rubber layer sheet (unvulcanized rubber) was arranged in a mold with flat cogs, in which tooth portions and groove portions are alternatively provided, in the state of the reinforcing cloth facing down, and press-pressurized at 75° C. to prepare a cog pad having cog portions embossed (which is not completely vulcanized and is in a semi-vulcanized state). Next, both ends of the cogged pad were vertically cut from the top of a cog mountain portion.

A cylindrical mold was covered with an inner mother mold having tooth portions and groove portions alternately provided, the cog pad was wound by engaging with the tooth portions and groove portions to joint at the top of the cog mountain portion, a first adhesion rubber layer sheet (unvulcanized rubber) was laminated on the cog pad wound, the tension member was spun spirally, and a second adhesion rubber layer sheet (the same as the first adhesion rubber layer sheet) and a tension rubber layer sheet (unvulcanized rubber) were sequentially wound thereon to prepare a molded article. Thereafter, the mold was covered with a jacket and arranged in a vulcanization can, and vulcanization was conducted at a temperature of 160° C. for 20 minutes to obtain a belt sleeve. This sleeve was cut into a V-shape by using a cutter to prepare a belt having the structure illustrated in FIG. 1, that is, a raw edge cogged V-belt (size: upper width: 22.0 mm, thickness: 11.0 mm and outer length: 800 mm) that is a variable speed belt having cogs at an inner circumferential side of the belt.

(Measurement of Properties of Vulcanized Rubber)

(1) Hardness

The compression rubber layer sheet was press-vulcanized at a temperature of 160° C. for 20 minutes to prepare a vulcanized rubber sheet (length: 100 mm, width: 100 mm and width: 2 mm). According to JIS K6253 (2012), a laminate obtained by piling three vulcanized rubber sheets was used as a sample, and hardness was measured by using Durometer Type A hardness tester.

(2) Abrasion Amount

A cylindrical sample having a diameter of 16.2±0.2 mm and a thickness of from 6 to 8 mm was prepared by cutting out by using a hollow drill having an inner diameter of 16.2±0.05 mm from a vulcanized rubber sheet (50 mm×50 mm×8 mm thickness) prepared by press-vulcanizing the compression rubber layer sheet at a temperature of 160° C. for 20 minutes. Abrasion amount of the vulcanized rubber was measured by using a rotary cylindrical drum apparatus (DIN abrasion tester) having a polishing cloth wound thereon, according to JIS K6264 (2005).

(3) Compressive Stress

The compression rubber layer sheet was press-vulcanized at a temperature of 160° C. for 20 minutes to prepare a vulcanized rubber molded article (length: 25 mm, width: 25 mm and thickness: 12.5 mm). Short fibers were made to orient in a vertical direction (thickness direction) to a compression surface. The vulcanized rubber molded article was sandwiched up and down with two metal compression plates (where an initial position was defined as the position of the upper compression plate in the sandwich state that the vulcanized molded article is not pressed with the compression plates), the upper compression plate was pressed on the vulcanized rubber molded article at a rate of 10 mm/min (pressing surface 25 mm×25 mm) to distort the vulcanized rubber molded article 20%, this state was maintained for 1 second, and the compression plate was returned upper to the initial position (preliminary compression). After repeating the preliminary compression 3 times, from a stress-strain curve measured in fourth compression test (conditions were the same as in the preliminary compression), stress when strain in a thickness direction of the vulcanized rubber molded article reached 10% was measured as compression stress. To minimize variation of measurement data, the preliminary compression was conducted 3 times.

(4) Bending Stress

The compression rubber layer sheet was press-vulcanized at a temperature of 160° C. for 20 minutes to prepare a vulcanized rubber molded article (length: 60 mm, width: 25 mm and thickness: 6.5 mm). Short fibers were made to orient in a direction parallel to the width of the vulcanized rubber molded article. As illustrated in FIG. 3, the vulcanized rubber molded article 21 was placed and supported on a pair of rotatable rolls (diameter 6 mm) 22a and 22b at the interval of 20 mm, and a metal pressure member 23 was placed on a central portion of an upper surface of the vulcanized rubber molded article in a width direction (orientation direction of short fibers). The tip of the pressure member 23 has a semi-circular shape having a diameter of 10 mm, and the vulcanized rubber molded article 21 can be smoothly pressed by the tip. Furthermore, during pressing, friction force acts between the lower surface of the vulcanized rubber molded article 21 and the rolls 22a and 22b with compression deformation of the vulcanized rubber molded article 21, but the influence by the friction is minimized by the rolls 22a and 23b being rotatable. The state that the tip of the pressure member 23 comes into contact with the upper surface of the vulcanized rubber molded article 21 but does not press was defined as "0", and stress when the pressure member 23 presses downward the upper surface of the vulcanized rubber molded article 21 at a rate of 100 mm/min from the state and strain of the vulcanized rubber molded article 21 in a thickness direction reached 10% was measured as bending stress.

(Shape and Area of Polyolefin in Compression Rubber Layer of Belt)

Regarding the polyolefin in the compression rubber layer of a belt, the belt was cut along a width direction and observed with a scanning electron microscope (SEM), and based on the obtained image, an average diameter (long diameter) of a major axis and an average diameter (short diameter) of a minor axis of polyolefin (polyolefin particles) were measured by using a measurement soft ("analySIS" manufactured by Soft Imaging System). Furthermore, regarding frictional power transmission surface (surface of compression rubber layer) in the circumference of the belt 1, the area occupied by the polyolefin particles (polyolefin phase) on the frictional power transmission surface was calculated at arbitrary three portions (area 1.2 mm$^2$ (1.0 mm×1.2 mm)) by using the measurement soft based on the image of a scanning electron microscope.

(Measurement of Properties of Belt)

(1) Friction Coefficient Measurement

As illustrated in FIG. 4, one end of the belt 31 cut was fixed to a load cell 32, a load 33 of 3 kgf was placed on other end, and the belt 31 was wound on a pulley 34 with a winding angle of the belt to the pulley 34 being 45°. The belt 31 at the load cell 32 side was pulled at a rate of 30 mm/min for about 15 seconds, and an average friction coefficient of a frictional power transmission surface was measured. During the measurement, the pulley 34 was fixed so as not to rotate.

(2) High Load Traveling Test

In this traveling test, power transmission efficiency of a belt when traveling in the state that the belt was largely bent (in the state of winding on small pulley) was evaluated.

The high load traveling test was conducted, as illustrated in FIG. 5, by using a biaxial traveling testing machine containing a drive (Dr.) pulley 42 having a diameter of 50 mm and a driven (Dn.) pulley 43 having a diameter of 125 mm. A raw edge cogged V-belt 41 was hung over each of the pulleys 42 and 43, a load of 3 N·m was applied to the driven pulley 43, and the belt 41 was traveled in room temperature atmosphere at the revolutions rate of the drive pulley 42 of 3,000 rpm. The number of revolutions of the driven pulley 43 was read by a detector immediately after traveling, and power transmission efficiency was obtained by the calculation formula described before. In Table 4, power transmission efficiency of Comparative Example 1 is indicated as "1", and power transmission efficiency of each example and comparative example is shown by a relative value. It was judged that when the value is larger than 1, the power transmission efficiency of the belt 41, that is, fuel consumption saving properties, is high.

(3) High Speed Traveling Test

In this traveling test, the power transmission efficiency of a belt when traveling in the state that a belt is slid to the outside of a pulley radius direction on a pulley was evaluated. Particularly, when the revolution rate of a drive pulley is increased, centrifugal force strongly acts to a belt. Furthermore, belt tension weakly acts at a position of a loose side of a drive pulley (see FIG. 6), and the belt attempts to fly out outside in a pulley radius direction at this position by the composite action with the centrifugal force. When the flying out is not smoothly conducted, that is, friction force strongly acts between the frictional power transmission surface of the belt and the pulley, transmission loss is generated by the friction force, leading to the decrease of power transmission efficiency.

The high speed traveling test was conducted, as illustrated in FIG. 6, by using a biaxial traveling testing machine containing a drive (Dr.) pulley 52 having a diameter of 95 mm and a driven (Dn.) pulley 53 having a diameter of 85 mm. A raw edge cogged V-belt 51 was hung over each of the pulleys 52 and 53, a load of 3 N·m was applied to the driven pulley 53, and the belt 51 was traveled in room temperature atmosphere at the revolution rate of the drive pulley 52 of 5,000 rpm. The number of revolutions of the drive pulley 52 was read by a detector immediately after traveling, and power transmission efficiency was obtained by the calculation formula described before. In Table 4, power transmission efficiency of Comparative Example 1 is indicated as "1", and power transmission efficiency of each example and comparative example is shown by a relative value. It was judged that when the value is larger than 1, the power transmission efficiency, that is, fuel consumption saving properties, is high.

(4) Durability Traveling Test

The durability traveling test was conducted, as illustrated in FIG. 7, by using a biaxial traveling testing machine containing a drive (Dr.) pulley 62 having a diameter of 50 mm and a driven (Dn.) pulley 63 having a diameter of 125 mm. A raw edge cogged V-belt 61 was hung over each of the pulleys 62 and 63, a load of 10 N·m was applied to the driven pulley 63, and the belt 61 was traveled for at most 60 hours at an ambient temperature of 80° C. at the revolution rate of the drive pulley 62 of 5,000 rpm. It was judged that when the belt 61 was traveled for 60 hours, there is no problem in durability. Furthermore, a side surface of the belt (surface in contact with a pulley) after traveling was observed with a microscope, and the presence or absence of peeling of the tension member was examined. Regarding the peeled portion, depth of peeling was measured with a microscope. Furthermore, a side surface of the compression rubber (surface in contact with a pulley) after traveling was visually observed, and the presence or absence of cracks was examined. Furthermore, regarding the belt after the high load durability traveling, friction coefficient and power transmission efficiency were measured.

Properties of a vulcanized rubber and properties of a belt are shown in Table 4.

TABLE 4

|  |  | Example ||||||||| Comp. Ex. ||
|---|---|---|---|---|---|---|---|---|---|---|---|---|
|  |  | 1 | 2 | 3 | 4 | 5 | 6 | 7 | 8 | 9 | 1 | 2 |
|  | Hardness (°) | 88 | 89 | 90 | 92 | 90 | 90 | 90 | 90 | 90 | 88 | 90 |
|  | Abrasion amount (mg) | 160 | 140 | 120 | 90 | 130 | 100 | 120 | 120 | 130 | 170 | 160 |
|  | Compressive stress (MPa) | 1.75 | 1.85 | 2.10 | 3.20 | 1.85 | 2.25 | 1.90 | 2.15 | 2.35 | 1.70 | 2.40 |
|  | Bending stress (MPa) | 3 | 3.1 | 3.4 | 5.1 | 3.1 | 3.6 | 3.1 | 3.5 | 3.6 | 2.9 | 3.4 |
| Shape of polyolefin particle | Long diameter (μm) | 200 | 190 | 195 | 200 | 210 | 200 | 40 | 250 | 35 | — | — |
|  | Short diameter (μm) | 80 | 90 | 85 | 90 | 80 | 95 | 20 | 120 | 20 | — | — |
|  | Aspect ratio | 2.5 | 2.1 | 2.3 | 2.2 | 2.6 | 2.1 | 2.0 | 2.1 | 1.8 | — | — |
|  | Area occupied by polyolefin phase in frictional power transmission surface (%) | 0.85 | 3.85 | 7.01 | 23.1 | 6.95 | 6.19 | 7.53 | 6.24 | 8.25 | — | — |
|  |  | 0.96 | 3.96 | 7.59 | 24.9 | 9.96 | 7.42 | 7.96 | 7.59 | 8.89 | — | — |
|  |  | 1.05 | 4.2 | 8.03 | 25.6 | 7.81 | 8.53 | 8.45 | 7.96 | 9.13 | — | — |
| Properties of belt |  |  |  |  |  |  |  |  |  |  |  |  |
|  | Friction coefficient | 1.2 | 1.0 | 0.7 | 0.5 | 0.7 | 0.7 | 0.7 | 0.7 | 1.0 | 1.3 | 1.2 |
| Power transmission efficiency | High load traveling | 1.03 | 1.04 | 1.03 | 1.01 | 1.03 | 1.03 | 1.03 | 1.03 | 1.01 | 1.00 | 1.01 |
|  | High speed traveling | 1.04 | 1.04 | 1.04 | 1.03 | 1.04 | 1.04 | 1.04 | 1.04 | 1.03 | 1.00 | 1.01 |
| High load durability traveling | Durability (hour) | 60 | 60 | 60 | 60 | 60 | 60 | 60 | 60 | 60 | 60 | 60 |
|  | Presence or absence of tension member peeling | Depth 1.5 mm | None | None | None | None | None | None | None | None | Depth 2.5 mm | None |
|  | Presence or absence of cracks | 2 | None | None | None | None | None | None | None | 1 | 5 | 4 |
| Properties of belt after high load durability traveling |  |  |  |  |  |  |  |  |  |  |  |  |
|  | Friction coefficient | 1.5 | 1.2 | 0.9 | 0.7 | 0.9 | 0.9 | 0.9 | 0.9 | 1.2 | 1.7 | 1.6 |
| Power transmission efficiency | High load traveling | 1.04 | 1.07 | 1.10 | 1.15 | 1.08 | 1.09 | 1.07 | 1.09 | 1.08 | 1.00 | 1.01 |
|  | High speed traveling | 1.06 | 1.09 | 1.11 | 1.17 | 1.09 | 1.10 | 1.10 | 1.11 | 1.10 | 1.00 | 1.01 |

As is apparent from Table 4, comparing the examples with the comparative examples, it can be seen that by the addition of polyolefin, compressive stress is improved (increased) and tension member peeling and crack are improved. This can be presumed that the polyolefin played a role of a reinforcing material, volume fraction of short fibers was decreased, and as a result, durability was improved. It can be further seen that by addition of polyolefin, change in a friction coefficient between before durability and after durability is small, and power transmission efficiency is improved. This can be presumed that even though the short fibers are worn by friction, reduction of a friction coefficient is attempted by the polyolefin projecting on the belt surface. Furthermore, comparing polyethylene with polypropylene, addition of polyethylene showed slightly excellent durability.

Regarding the examples, as a result of observing the shape of the polyolefin in the compression rubber layer by SEM, all showed a long slender shape similar to potato shape, and they were dispersed in the state that a major axis direction was oriented in a width direction of a belt. SEM photograph (image) of the belt cross-section (cross-section cut in a belt width direction) obtained in Example 3 is shown in FIG. 8. Of the particles (dispersed phase) dispersed in the drawing, large particles are polyethylene, and small particles are aramid short fibers.

Although the present invention has been described in detail and by reference to the specific embodiments, it is apparent to one skilled in the art that various modifications or changes can be made without departing the spirit and scope of the present invention.

This application is based on Japanese Patent Application No. 2013-073402 filed on Mar. 29, 2013 and Japanese Patent Application No. 2014-043510 filed on Mar. 6, 2014, the contents of which are incorporated herein by reference.

INDUSTRIAL APPLICABILITY

The power transmission belt of the present invention can be utilized as various belts in which transmission loss is required, and is preferably a frictional power transmission belt. Examples of the frictional power transmission belt include a raw edged belt having a V-shaped cross-section, a raw edge cogged V-belt having cogs provided on an inner circumferential side or both an inner circumferential side and an outer circumferential side of a raw edged belt, and a V-ribbed belt. Particularly, it is preferred to apply to a belt (a variable speed belt) used in a transmission in which speed change ratio is continuously changed during traveling the belt, for example, a raw edge cogged V-belt and a raw edge double cogged V-belt in motorcycles, ATV (four-wheeled buggy), snowmobiles and the like.

DESCRIPTION OF REFERENCE NUMERALS AND SIGNS

1: Adhesion rubber layer
2: Tension member
3: Compression rubber layer
4: Tension rubber layer

The invention claimed is:
1. A power transmission belt comprising:
a tension member extending in a belt lengthwise direction;
an adhesion rubber layer in contact with at least a part of the tension member;
a compression rubber layer formed on one surface of the adhesion rubber layer; and
a tension rubber layer formed on other surface of the adhesion rubber layer,
wherein the compression rubber layer is formed of a vulcanized rubber composition containing a rubber component, a polyolefin resin and a reinforcing material, the rubber component contains a chloroprene rubber, and the reinforcing material contains short fibers and carbon black, and wherein the reinforcing material has a proportion of 80 parts by mass or less per 100 parts by mass of the rubber component.

2. The power transmission belt according to claim 1, wherein the polyolefin resin has a proportion of from 5 to 40 parts by mass per 100 parts by mass of the rubber component.

3. The power transmission belt according to claim 1, wherein the polyolefin resin has a proportion of from 15 to 50 parts by mass per 100 parts by mass of the reinforcing material.

4. The power transmission belt according to claim 1, wherein the short fiber has a proportion of from 15 to 25 parts by mass per 100 parts by mass of the rubber component.

5. The power transmission belt according to claim 1, wherein the polyolefin resin has an average molecular weight of from 200,000 to 6,000,000 in a method measured according to ASTM D4020.

6. The power transmission belt according to claim 1, wherein a raw material of the polyolefin resin has an average particle diameter of from 25 to 200 μm.

7. The power transmission belt according to claim 1, wherein the reinforcing material contains an aramid short fiber.

8. The power transmission belt according to claim 1, wherein the polyolefin resin is exposed on a surface of the compression rubber layer.

9. The power transmission belt according to claim 1, wherein the polyolefin resin has an occupation area of from 0.2 to 30% on a surface of the compression rubber layer.

10. The power transmission belt according to claim 1, used in a continuously variable transmission.

11. A power transmission belt comprising:
a tension member extending in a belt lengthwise direction;
an adhesion rubber layer in contact with at least a part of the tension member;
a compression rubber layer formed on one surface of the adhesion rubber layer; and
a tension rubber layer formed on other surface of the adhesion rubber layer,
wherein the compression rubber layer is formed of a vulcanized rubber composition containing a rubber component, a polyolefin resin and a reinforcing material, the rubber component contains a chloroprene rubber, and the reinforcing material contains short fibers,
wherein the polyolefin resin in the compression rubber layer has a long slender shape having an aspect ratio of from 1.6 to 10, a major axis direction is oriented in substantially parallel to a belt width direction, and a minor axis direction is oriented in substantially parallel to the belt lengthwise direction.

* * * * *